Dec. 18, 1956  F. B. JOHNSON  2,774,560
AERIAL DELIVERY PLATFORM
Filed Sept. 1, 1954  3 Sheets-Sheet 1
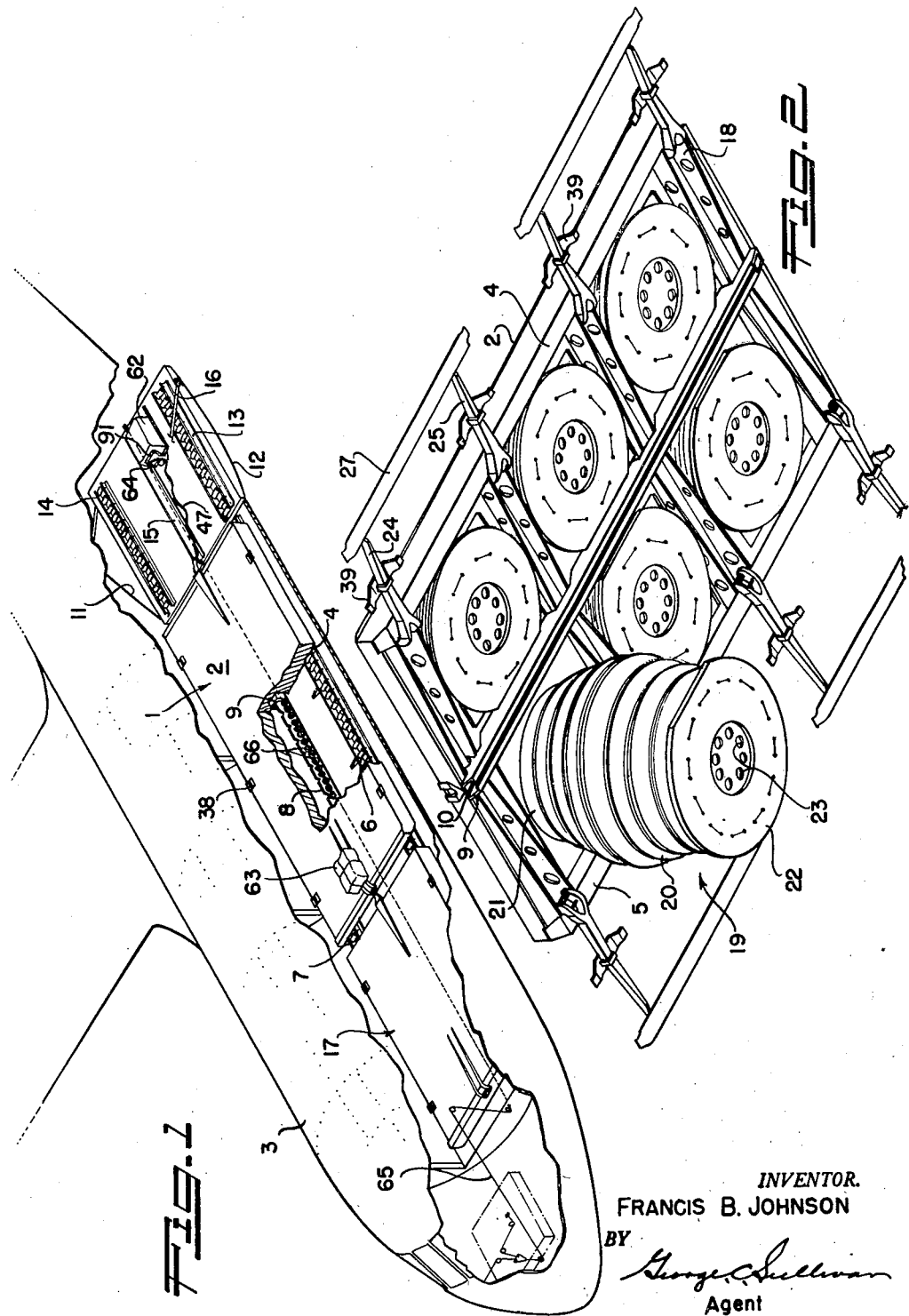
INVENTOR.
FRANCIS B. JOHNSON
BY
Agent

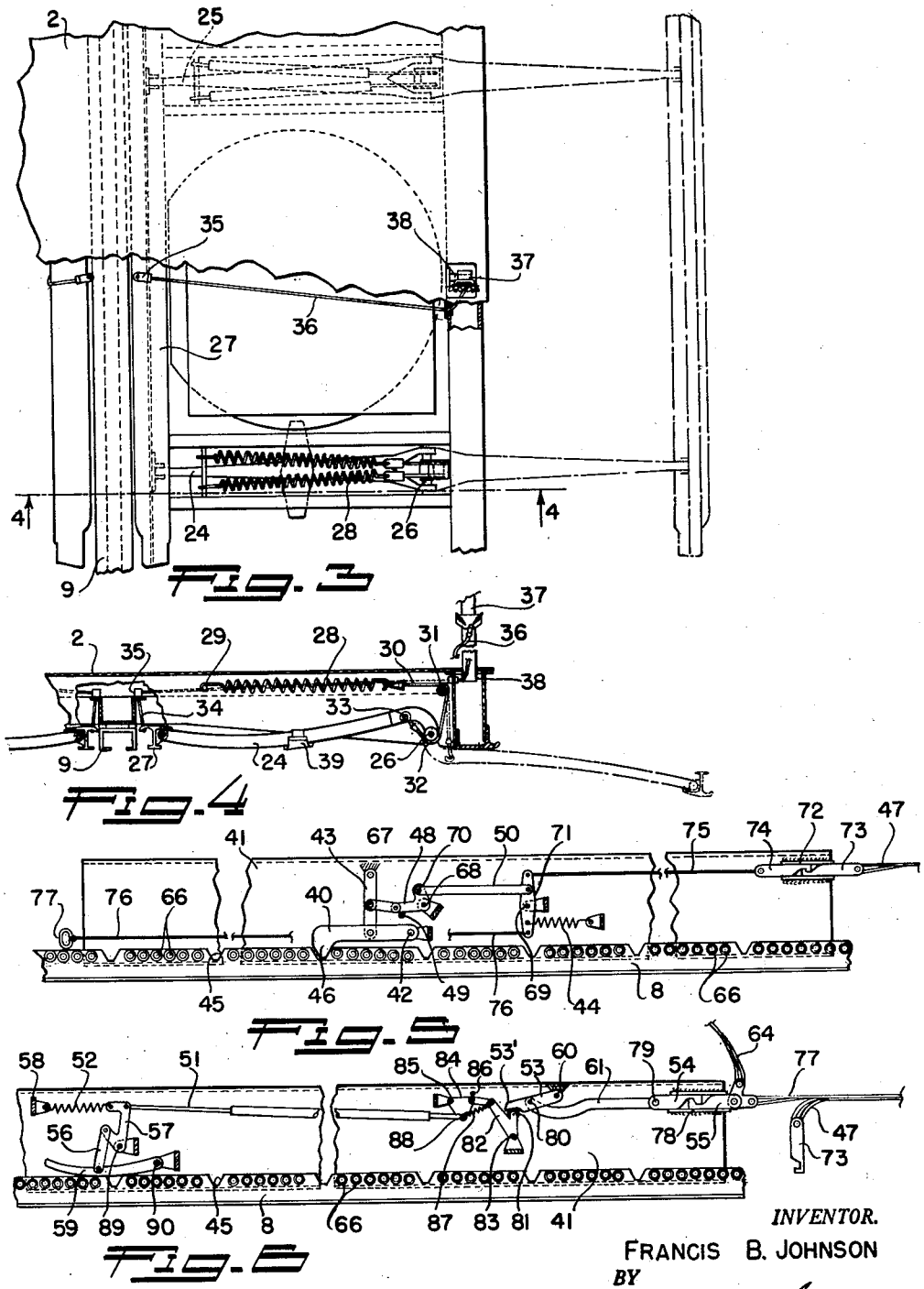

Dec. 18, 1956                F. B. JOHNSON                2,774,560
                         AERIAL DELIVERY PLATFORM
Filed Sept. 1, 1954                                     3 Sheets-Sheet 3
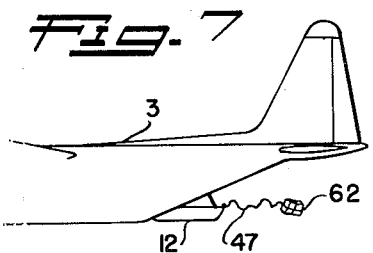
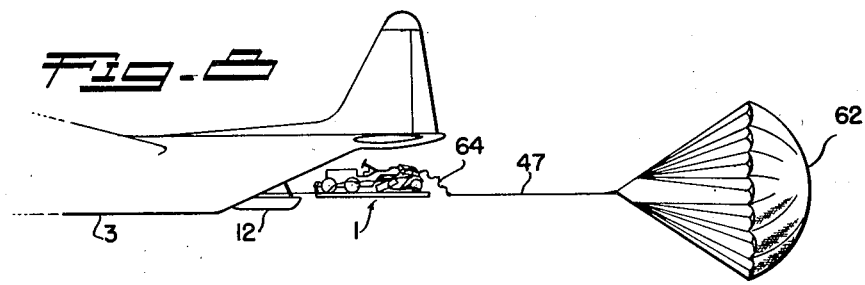
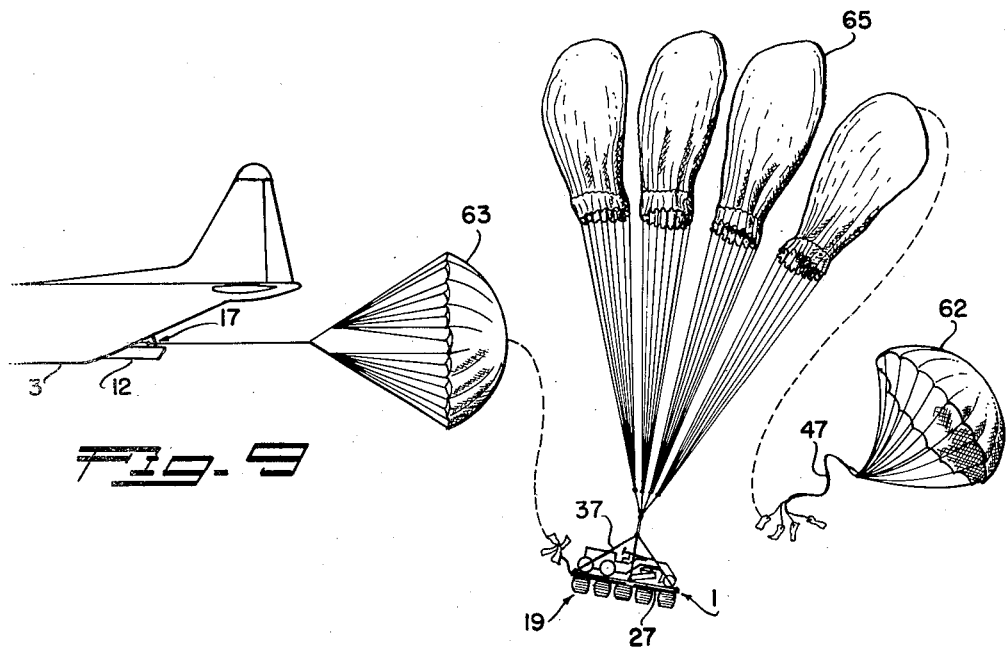
INVENTOR.
FRANCIS B. JOHNSON
BY
Agent – # United States Patent Office 2,774,560
Patented Dec. 18, 1956

2,774,560
AERIAL DELIVERY PLATFORM

Francis B. Johnson, Atlanta, Ga., assignor to Lockheed Aircraft Corporation, Burbank, Calif.

Application September 1, 1954, Serial No. 453,631

8 Claims. (Cl. 244—138)

This invention relates, generally, to aerial delivery systems and, more particularly, to a load supporting platform arranged to be carried within an aircraft and released in flight for delivering items secured thereto. Suitable drag producing means, such as a parachute, is employed for reducing the free-fall terminal velocity of the platform while retractable stabilizing arms and collapsible shock absorbers cooperate to avoid damage caused by landing impact loads and platform toppling.

The delivery of machinery and supplies from aircraft by parachute drop offers many obvious advantages in both military and commercial aviation and while its use has been practiced with the military to some extent in emergency situations in recent years, the fact that the items dropped in this manner were frequently damaged has discouraged more extensive use of the method. Even with a rate of descent as low as 20 to 30 feet per second for the parachute delivery, equipment damage frequently results using conventional apparatus because of excessive shock loads produced at ground contact or because the load supporting platform upsets due to bouncing, uneven terrain, side drift caused by surface winds, or by being dragged by the parachute along the ground in a surface wind until some upsetting obstacle is struck.

Damage caused solely by impact loads in dropping machinery and supplies by parachute can be largely overcome by the use of shock absorbers. However, due to the varying atmospheric and topographical conditions under which such operations are carried out, stability problems are introduced which are equally as destructive as the undamped impact loads. Air currents as well as the air density materially affect the rate of descent and approach angle of the platform, making it impossible as a practical matter to always provide the proper amount of impact energy absorption. Even if all the vertical impact energy is properly consumed in the initial compression stroke of the shock absorbing elements, lateral inertia components and rotational accelerations are sufficient to cause the equipment to bounce, pitch, roll, and overturn. It is therefore apparent that conventional shock absorbers by themselves are incapable of cushioning an aerial delivery platform in a manner which will dependably avoid damaging the load under the varied conditions encountered in such operations.

An object of this invention is to provide an aerial delivery platform having anti-toppling stabilizing arms which cooperate with collapsible cushioning means to reduce impact landing loads and to maintain the platform in an upright attitude under most any atmospheric and topographical conditions which may be encountered when the platform is dropped from an aircraft.

Another object of this invention is to provide an aerial delivery platform which serves as the deck floor of an aircraft and which may be readily and by remote control ejected from the aircraft and dropped by parachute.

Still another object of this invention is to provide an aerial delivery platform with retractable stabilizer arms which automatically swing from a stowed position within the platform to an outwardly projecting stabilizing position when the platform is ejected from the aircraft whereby a large load carrying capacity is obtained for a given platform size.

Further and other objects will become apparent from a reading of the following description, especially when considered in combination with the accompanying drawing wherein like numerals refer to like parts.

In the drawing:

Figure 1 is a fragmentary perspective view of the delivery platform shown installed in an aircraft;

Figure 2 is a perspective view of the delivery platform;

Figure 3 is a fragmentary plan view of a platform showing the construction details of the stabilizing arms;

Figure 4 is a sectional view taken on line 4—4 of Figure 3;

Figure 5 is a fragmentary sectional side view of the delivery platform showing schematically the mechanism for securing the platform in an aircraft;

Figure 6 is a fragmentary sectional side view of the delivery platform showing schematically the mechanism for releasing the extraction means; and Figures 7, 8 and 9 are views showing in sequence the different stages in extracting the platform from an aircraft.

As best shown in Figures 1 and 2, platform 1 includes a flat panel 2 having a generally rectangular plan form shape which will allow the platform to serve as the deck floor of the cargo compartment inside an aircraft 3. A pair of runners 4 and 5 are provided on the underside of panel 2 at the longitudinal edges thereof which engage roller-type conveyors 6 and 7 carried by aircraft 3 within the cargo compartment for minimizing the force required to move the platform in and out of the aircraft.

A center restraint rail 8, secured to the cargo compartment structure, extends longitudinally of the aircraft and parallel with conveyors 6 and 7. A channel member 9, carried by platform 1, on the underside thereof, is arranged to engage restraint rail 8 for guiding the platform in its movement into and out of the cargo compartment. As shown in the drawing, rail 8 is equipped with rollers 66 which engage laterally inwardly directed flanges 10 formed on channel 9 to restrain the platform against movement in any direction other than fore and aft of the aircraft.

An opening 11, formed in aircraft 3, provides a passage through which platform 1, even when loaded, may be moved into and out of the cargo compartment. A door 12, hinged to swing about the lower edge of the opening is provided with conveyor extensions 13 and 14 and a center restraint rail extension 15, which are coaxially aligned with conveyors 6 and 7 and rail 8, respectively, in the cargo compartment when the door is in the fully open position to insure proper extraction of platform 1. The opening and closing movement of door 12 is suitably controlled through means such as cables 16, as shown in Figure 1.

As best shown in Figure 2, runners 4 and 5 and transverse reinforcing members 18 secured to the underside of panel 2, form a plurality of recesses into which collapsible shock absorbers 19 are stowed. Each shock absorber 19 includes a flexible bellows type cylindrically shaped bag 20 secured at one end 21 to the underside of panel 2 and at the opposite end to a foot-like plate 22 in a suitable fluid-tight manner. Plate 22 is sufficiently heavy so that the force of gravity will tend to expand the bag, causing it to breathe in air at atmospheric pressure through a plurality of check valves 23 formed in plate 22 when the plate is allowed to move away from the platform as indicated in the drawing. Check valves 23 trap the air in the bag for cushioning the platform from sudden shock loads when it is dropped from an aircraft, as hereinafter described.

A plurality of pairs of stabilizing arms 24 and 25 are swingably carried by platform 1 at the longitudinal edges thereof through pins 26, as best shown in Figures 3 and 4, for movement from a retracted position within the recesses in the underside of platform 1 on either side of shock absorbers 19 to an extended position directed generally outwardly from the platform. Skis 27 are provided which connect with the free ends of each pair of stabilizing arms 24 and 25 to allow smooth, horizontal motion of the platform when landing. Arms 24 and 25 are curved in a like manner adjacent their inner ends 26, as shown in Figure 4, so that when they are in the retracted position the complete stabilizer assembly, including skis 27, are housed within the platform recesses and when in the fully extended position they rest against the underside of runners 4 and 5 so as to deflect under load and thereby assist shock absorbers 19 in reducing landing impact loads. As is evident from the drawing, the length of the plurality of pairs of arms 24 and 25 is substantially half the width of the platform whereby skis 27 in the retracted position rest closely adjacent channel member 9.

Arms 24 and 25 are always urged toward the extended position shown in Figure 2 by means of springs 28 which are secured to the platform structure at one end by pin 29 and to its associated stabilizing arm through cable 30, as most clearly shown in Figure 4. Cable 30 is guided over a roller 31 carried by the underside of panel 2 and over a second roller 32 carried by pin 26 to connect with the arm at pin 33 and apply the spring force in the proper direction to urge the arm outwardly.

A shear wire 34, associated with each pair of arms 24 and 25, connects with ski 27 to hold the assembly in the retracted position against the action of springs 28. Wires 34 are each secured to a linearly actuated shearing device, as shown in Figure 4. A cable 36, operatively connecting with shearing device 35, extends laterally of the platform below panel 2 and emerges through an opening in the edge of the panel to connect with a flexible main lowering parachute riser 37 secured to one of a plurality of brackets 38 on the platform. The length of cable 36 is such that when riser 37 is drawn taut the cable is pulled, shearing wire 34. This releases skis 27 and allows arms 24 and 25 to swing outwardly to the extended platform stabilizing position.

Cleats 39, carried by each of the plurality of pairs of arms 24 and 25, as best shown in Figure 2, are arranged to engage foot-like plates 22 when the arms are in the retracted position and thus hold the shock absorbers in the compressed or collapsed condition. Only after arms 24 and 25 are released by wire 34 will the shock absorbers be allowed to expand and project below the platform structure.

Since the cargo compartment of modern transport aircraft will hold large quantities of supplies and equipment, and since it is desirable to air-drop such quantities in separate units, more than one platform may optionally be provided. Therefore, a plural platform arrangement is illustrated in Figure 1, wherein platforms 1 and 17, similar in construction and operation, though of different length, are arranged one behind the other.

Platforms 1 and 17 are secured individually in the desired position within the cargo compartment of aircraft 3. A plurality of spaced notches 45 are formed in restraint rail 8 on the cargo compartment floor for receiving a latch pawl 46 on latch member 40 and preventing longitudinal platform movement relative to the restraint rail, as schematically shown in Figure 5. The latch member 40, carried by the platform structure 41 through pin 42 is retained, with the pawl 46 in a notch 45, by the toggle linkage 43 carried by the platform structure 41 through pin 67. The toggle linkage 43 is positively locked on dead center by toggle linkage 48 carried by platform structure 41 through pin 68. A latch control arm 70 on toggle linkage 48 is connected to a bellcrank 71 by link 50. Bellcrank 71, carried by the platform structure through pin 69, is connected to spring 44 which urges the bellcrank in a counter-clockwise direction, as viewed in Figure 5, to normally maintain toggle linkage 48 in a past-dead-center position engaging stop 49.

Latch member 40 is actuated to release the platform by a force exerted on an extraction parachute riser 47 at the beginning of the platform extraction operation. Riser 47 connects to plug 73 which is interlocked with plug 74 inside tube 72, which is a part of the platform structure. Plug 73 and plug 74 slide out of tube 72 and exert a force on cable 75 connecting plug 74 with bellcrank 71. This causes clockwise rotation of bellcrank 71, as viewed in Figure 5, which causes toggle linkage 48 to move away from stop 49, toggle linkage 43 to swing overcenter, and a force to be exerted, causing rotation of latch member 40 to release the platform from rail 8. Latch member 40 may be actuated for emergency manual control by a pull on handle 77 located at the forward end of the platform and connected to bellcrank 71 by cable 76.

Parachute riser 47 is attached to parachute riser 77, as indicated in Figure 6, with the ends of each at a suitable distance to cause riser 47 to pull plugs 73 and 74, in Figure 5, out of tube 72 before parachute riser 77 becomes taut. When the interlocking hooks on plug 73 and plug 74 are outside tube 72, they disengage; thus the platform and parachute riser 47 are separated and parachute riser 77 then becomes taut.

Parachute riser 77 is attached to plug 55 which remains locked in tube 78 carried by the platform structure 41 while the shoe 59 is riding on restraint rail 8, as schematically shown in Figure 6, thus a force exerted on the parachute riser 77 extracts platform 1 or 17 from airplane 3. Plug 55 is interlocked with plug 54 inside tube 78 and the plugs are restrained from sliding out by link 61 connecting with plug 54 through pin 79 and with crank 53 through pin 80. Crank 53 is carried by the platform structure 41 through pin 60 and is urged in a counter-clockwise direction, as viewed in Figure 6, by a force exerted on the parachute riser 77. Crank 53 is restrained from counter-clockwise rotation by means of a latch finger 53' extending from crank 53 over a roller 81 carried by latch crank 82 which is carried by the platform structure 41 through pin 83. Latch crank 82 is positively restrained from rotation by a toggle linkage 84 carried by the platform structure through pin 85. The toggle linkage 84 is urged over center against stop 87 carried by platform structure 41 by either a force from the mechanical toggle spring 87 or counter-clockwise forces from the latch crank 82, or both.

A mechanical spring 52, carried by the platform structure 41 through pin 58, is connected to a release control crank 57, which is carried by platform structure 41 through pin 89, and urges the release control crank 57 in a counter-clockwise direction, as viewed in Figure 6. A link 56, connecting release control crank 57 with a release control shoe 59, carried by platform structure 41 through pin 90, urges the shoe downwardly against restraint rail 8. When the platform is extracted, the shoe rotates in a counter-clockwise direction, as viewed in Figure 6, after it clears rail 8, allowing mechanical spring 52 to exert a force on link 51 which connects release control crank 57 to toggle linkage 84 through pin 88. This force overcomes the forces holding the toggle linkage 84 against stop 86 and pulls the toggle linkage from the overcenter position and away from stop 86. This rotates latch crank 82 in a counter-clockwise direction moving roller 81 away from finger 53' on crank 53, thus unlatching the crank and allowing it to rotate in a counter-clockwise direction. Link 61 moves aft and plug 54 and plug 55 slide out the end of tube 78 a suitable distance so that the interlocking hooks on the two plugs are free to disengage, thus parachute riser 77 and its associated platform is separated.

Once the parachute riser 77 and plug 55 are separated from platform 1 or 17 the force exerted on parachute riser 77 then pulls ripcord 64, which is also attached to plug 55 as shown in Figure 6, and ripcord 64 pulls the cover off the main lowering parachute assembly. Parachute riser 77 is then free from all connections with the platform as indicated in Figure 8.

The force required to extract the platform is produced with small extraction parachutes 62 and 63 as shown in Figure 1. Extraction chute 62 for platform 1, which is located nearest the opening 11 in the cargo compartment, is carried by door 12 on a small spring loaded catapult device 91. Any suitable means may be provided for triggering the catapult, one such means being shown as a manual system wherein a pull cable 65 is fed from the cockpit of aircraft 3 to door 12. By opening door 12 and pulling on cable 65, parachute 62 which is connected to platform 1 through parachute risers 47 and 77 is catapulted into the airstream. The drag on the parachute releases platform 1 and pulls it through opening 11. Extraction parachute 63 for platform 17 is carried on the end of platform 1 nearest to platform 17. When platform 1 is extracted and the riser lines to extraction chute 63 become taut, the chute is jerked from platform 1, as shown in Figures 8 and 9, and opens in the airstream; thus the drag on extraction chute 63 releases and pulls platform 17 through opening 11. Steps in extracting platform 17 are identical to those described above for platform 1.

Once the platform 1 or 17 has moved clear of the aircraft and begins dropping earthward, riser 77 pulls ripcord 64 on a main lowering parachute assembly 92 and then frees itself from all connections with the platform, as indicated in Figures 7 through 9. Parachute risers 37 connect parachute assembly 92 with platform 1 or 17 through brackets 38, as shown in Figure 4, to stabilize the platform in a right-side-up attitude and to maintain a reasonably low platform rate of descent.

As main lowering parachute risers 37 are drawn taut, shear wires 34 are severed, allowing arms 24 to swing to their extended platform stabilizing position, as shown in Figure 4. As arms 24 move outwardly, shock absorbers 19 open by the force of gravity, breathe in air and expand, as previously set forth.

The use and operation of the aerial delivery platforms described herein is believed obvious from the foregoing description. As many platforms as may be required, limited only by the capacity of the aircraft, are loaded with supplies or equipment, such as vehicles, and the items to be air-dropped are properly secured. The platforms are then installed so that runners 4 and 5 on each platform will engage roller conveyors 6 and 7 and so that channel member 9 on the underside of the platforms properly engage the center restraint rail 8. The platforms are then secured in their desired position within the cargo compartment by latch 40, as shown in Figure 5. After the platforms are properly secured in the aircraft, the extraction and lowering parachutes are connected through their risers, as previously described.

To air-drop the platforms and the equipment secured thereto, the aircraft crew performs the necessary operations to open cargo 12 and actuate catapult 91 for ejecting extraction parachute 62. As the airstream strikes extraction chute 62 it is caused to open and produce a drag force pulling the platforms toward the opening in the aft end of the aircraft and extract platform 1, as described hereinabove. As platform 1 leaves the aircraft it pulls parachute 63 into the airstream to extract platform 17.

Within a few seconds after the main lowering parachute assembly has been opened by the extraction parachute, as previously described, the platform stabilizing arms and shock absorbers will have moved to their operative positions in readiness for a landing.

Initial ground contact by the platform is made through shock absorbers 19 which deflect through a relatively long stroke to reduce landing impact loads. The impact energy which is not completely absorbed in the shock absorbers in the initial compression stroke unavoidably causes the platform to bounce. As this bouncing about occurs, the stabilizing arms on the platform engage the ground through their skis to maintain the platform in the proper attitude while the impact energy is being dissipated.

The anti-toppling effect of the platform stabilizer arms is obtained not only because the arms are distant from the center of gravity of the loaded platform but also because of their construction wherein they are deflectable, in a spring-like manner to return the platform to an upright position resting on the shock absorbers. As a result, the platform may be well cushioned by long stroke shock absorbers for maintaining a low platform impact shock load level without danger of having the platform bounce so violently as to cause the same to topple over.

While the platform has been described for use in connection with a specific parachute delivery system, it is merely an example of one way of employing the platform for air-dropping supplies and equipment and it is, therefore, to be understood that certain alterations, modifications and substitutions may be made to the instant disclosure without departing from the spirit and scope of this invention, as defined by the appended claims.

I claim:

1. An aerial delivery platform adapted to be carried by an aircraft and released therefrom in flight comprising, a load supporting panel, extraction means connecting with said panel and releasably securing said platform to said aircraft, normally stowed drag producing means connecting with said panel and with said extraction means for decreasing the free fall terminal velocity of said device and for stabilizing the platform in a right-side-up position throughout its descent in response to actuation of said ejection means, a plurality of spring-like arms swingably carried by the underside of said panel adjacent the outer edges thereof for movement between a retracted position resting against the underside of said panel and an extended position projecting generally outwardly from the panel for absorbing shock loads and maintaining the platform right-side-up when landing, spring means acting between said panel and said arms and urging the latter into the extended position, and means carried by said panel for securing said arms in a retracted position against the action of said spring means while said platform is carried by said aircraft.

2. An aerial delivery platform adapted to serve as the deck floor of an aircraft within the fuselage and be ejected therefrom in flight for delivering items secured thereto comprising, a rigid load supporting panel, holding means carried by said panel and releasably securing the platform to said aircraft, extraction means operatively engaging said holding means for releasing the latter and forcefully freeing the platform from the aircraft upon actuation, drag producing means connecting with said panel for decreasing the free fall terminal velocity of the platform and for stabilizing the same in a right-side-up position throughout its descent, said drag producing means being operative only in response to actuation of said extraction means, a plurality of arms swingably carried by said panel for movement between a retracted position lying closely adjacent said panel to an extended position projecting generally outwardly from the panel for stabilizing the platform when landing, spring means acting between said panel and said arms and urging the latter into the extended position, means carried by said panel and releasably securing said arms in the retracted position against the action of said spring means, and means responsive to said drag producing means for releasing the last mentioned means whereby said arms will swing to the outwardly projecting extended position only after the platform is released from the aircraft.

3. An aerial delivery platform adapted to serve as the deck floor of an aircraft within the fuselage and be released therefrom in flight for delivering items secured thereto comprising, a load supporting panel, extraction means releasably securing said panel to said aircraft, normally stowed drag producing means connecting with said panel and with said extraction means for decreasing the free fall terminal velocity of the platform and for stabilizing the same in a right-side-up attitude throughout its descent in response to actuation of said extraction means, said platform having a recess formed in the underside thereof, a flexible shock absorbing bag secured to said panel within said recess for expanding when filled with fluid to project beyond the underside of said platform and reduce landing impact loads, a plurality of arms swingably carried by said panel for movement between a retracted position lying closely adjacent said panel and an extended stabilizing position projecting generally outwardly from said panel, said arms holding said bag in the collapsed condition only when the arms are in the retracted position, spring means acting between said panel and said arms and urging the latter into the extended position, and means carried by said platform for securing said arms in the retracted position against the action of said spring means only so long as said drag producing means remain stowed.

4. An aerial delivery platform adapted to serve as the deck floor of an aircraft within the fuselage and be released therefrom in flight for delivering items secured thereto comprising, a generally rectangular load supporting panel, conveyor engaging runners secured to said panel on the underside thereof for supporting the platform within the aircraft, a restraint rail engaging channel member carried by said panel and providing guided movement of the platform within the aircraft, latch means carried by said panel for releasably securing the platform to the aircraft, platform extraction means connecting with said panel, said latch means being responsive to actuation of said extraction means for releasing the platform and allowing movement thereof from the aircraft, drag producing means connecting with said panel and with said extraction means for decreasing the free fall terminal velocity of the platform and for stabilizing the same in a right-side-up attitude throughout its descent in response to actuation of said extraction means, a plurality of arms swingably carried by said panel for movement from a retracted position lying closely adjacent said panel to an extended platform stabilizing position projecting outwardly from said panel and generally parallel with the platform loading surface, spring means acting between said panel and said arms and urging the latter into the extended position, arm securing means carried by said platform for holding said arms in the retracted position against the action of said spring means, said arm securing means being responsive to actuation of said drag producing means for releasing said arms, collapsible bellows type shock absorbing means carried by said panel between said runners for minimizing platform landing impact loads, and control means carried by said arms for maintaining said shock absorbing means in the collapsed condition only so long as said arms are retracted.

5. An aerial delivery platform adapted to serve as the deck floor of an aircraft within the fuselage and be released therefrom in flight for delivering items secured thereto comprising, a generally rectangular load supporting panel, conveyor engaging runners secured to said panel on the underside thereof for supporting the platform within the aircraft, a restraint rail engaging channel member carried by said panel and providing guided movement of the platform within the aircraft, latch means carried by said panel for releasably securing the platform to the aircraft, platform extraction means connecting with said panel, said latch means being responsive to actuation of said extraction means for releasing the platform and allowing movement thereof from the aircraft, drag producing means connecting with said panel and with said extraction means for decreasing the free fall terminal velocity of the platform and for stabilizing the same in a right-side-up attitude throughout its descent in response to actuation of said extraction means, a plurality of arms swingably carried by said panel for movement from a retracted position lying closely adjacent said panel to an extended platform stabilizing position projecting outwardly from said panel and generally parallel with the platform loading surface, spring means acting between said panel and said arms and urging the latter into the extended position, arm securing means carried by said platform for holding said arms in the retracted position against the action of said spring means, said arm securing means being responsive to actuation of said drag producing means for releasing said arms, a flexible bellows connecting at one end with the underside of said panel between said runners, an end plate secured to the free end of said flexible bellows to form a fluid tight cavity between the plate and the panel, the weight of said end plate being sufficient to expand said bellows, means carried by said arms for maintaining said bellows in the collapsed condition by supportingly engaging said end plate and holding the same in a stowed position between said runners in opposition to the force of gravity only so long as said arms are retracted, and check valve means carried by said end plate and arranged to admit air into the cavity when expanding the bellows for absorbing platform landing impact loads.

6. An aerial delivery platform adapted to be carried through the air and dropped comprising, a load supporting panel having a recess formed in the underside thereof, low pressure expandable shock absorbing means carried by said panel within said recess, control means connecting with said shock absorbing means for effecting expansion of the latter whereby the shock absorbing means will project below said panel for absorbing platform landing loads, and arms swingably carried by said panel for movement from a retracted position adjacent the underside of said panel to an extended platform stabilizing position projecting outwardly from said panel and generally parallel with the platform load supporting surface for maintaining the platform right-side-up when landing on said shock absorbing means.

7. An aerial delivery platform adapted to be carried through the air and dropped comprising, a load supporting panel having a recess formed in the underside thereof, low pressure expandable shock absorbing means carried by said panel within said recess, control means connecting with said shock absorbing means for effecting expansion of the latter whereby said shock absorbing means will project below said panel for absorbing platform landing loads, arms swingably carried by said panel for movement from the retracted position adjacent said panel to an extended platform stabilizing position projecting outwardly from said panel and generally parallel with the platform load supporting surface for maintaining the platform right-side-up when landing on said shock absorbing means, and means carried by said arms and operatively engaging said control means for allowing expansion of said shock absorbing means only when said arms are moved from the retracted position.

8. An aerial delivery platform adapted to serve as the deck floor of an aircraft within the fuselage and be ejected therefrom in flight for delivering items secured thereto comprising, a rigid load supporting panel, holding means carried by said panel and releasably securing the platform to said aircraft, extraction means operatively engaging said holding means for releasing the latter and forcefully freeing the platform from the aircraft upon actuation, extraction release means carried by said platform and being responsive to movement of said platform from the aircraft for automatically releasing the extraction means, drag producing means connecting with said panel for decreasing the free fall terminal velocity of the platform and for stabilizing the same in a right-side-up position throughout its descent, said drag producing means being operative only in response to actuation of said extraction release means, a plurality of arms swingably carried by said panel for movement between a retracted position lying closely adjacent said panel to an extended position projecting generally outwardly from the panel for stabilizing and cushioning the platform when landing, spring means acting between said panel and said arms and urging the latter into the extended position, means carried by said panel and releasably securing said arms in the retracted position against the action of said spring means, and means responsive to said drag producing means for releasing the last mentioned means whereby said arms will swing to the outwardly projecting extended position only after the platform is released from the aircraft.

References Cited in the file of this patent

UNITED STATES PATENTS

| | | |
|---|---|---|
| 2,077,910 | Thomson | Apr. 20, 1937 |
| 2,555,352 | Lowell | June 5, 1951 |
| 2,684,219 | Thunbo | July 20, 1954 |

FOREIGN PATENTS

| | | |
|---|---|---|
| 604,938 | Great Britain | July 13, 1948 |
| 1,047,735 | France | July 29, 1953 |